US006920501B2

(12) United States Patent
Chu et al.

(10) Patent No.: US 6,920,501 B2
(45) Date of Patent: Jul. 19, 2005

(54) COMMUNICATION SOCKET MIGRATION AMONG DIFFERENT DEVICES

(75) Inventors: Hao-hua Chu, Mountain View, CA (US); Yu Song, San Carlos, CA (US); Shoji Kurakake, San Francisco, CA (US)

(73) Assignee: NTT Docomo, Inc., Tokyo (JP)

( * ) Notice: Subject to any disclaimer, the term of this patent is extended or adjusted under 35 U.S.C. 154(b) by 749 days.

(21) Appl. No.: 10/022,714

(22) Filed: Dec. 17, 2001

(65) Prior Publication Data

US 2003/0115357 A1 Jun. 19, 2003

(51) Int. Cl.[7] .............................................. G06F 13/00
(52) U.S. Cl. ..................................... 709/228; 709/237
(58) Field of Search ............................... 709/227, 228, 709/230, 237, 220–222

(56) References Cited

U.S. PATENT DOCUMENTS

| | | | | |
|---|---|---|---|---|
| 5,553,241 | A | * | 9/1996 | Shirakihara ................. 709/227 |
| 2002/0112085 | A1 | * | 8/2002 | Berg ........................... 709/250 |
| 2002/0116475 | A1 | * | 8/2002 | Berg ........................... 709/219 |
| 2002/0120761 | A1 | * | 8/2002 | Berg ........................... 709/230 |
| 2002/0138629 | A1 | * | 9/2002 | Schmidt et al. ............. 709/228 |

OTHER PUBLICATIONS

David K.Y. Yau et al.; Migrating Sockets—End System Support for Networking with Quality of Service Guarantees; IEEE/ACM Transactions on Networking; vol. 6, Issue 6; Dec. 1998.*

David K.Y. Yau et al.; Migrating Sockets for Networking with QUality of Service Guarantees; Proceedings of the 1997 International Conference on Network Protocols; pp. 73–82; Oct. 1997.*

Information Sciences Institute, *Transmission Control Protocol, Darpa Internet Program Protocol Specification, Defense Advanced Research Projects Agency*, Sep. 1981, Marina del Rey, California.

Huitema, *Network Working Group, Internet Draft, INRIA*, May 1995.

Snoeren, C. and Balakrishnan, H., *TCP Connection Migration, Internet Draft, MIT LCS*, Nov. 2000.

* cited by examiner

Primary Examiner—Kenneth R. Coulter
(74) Attorney, Agent, or Firm—Blakely, Sokoloff, Taylor & Zafman LLP

(57) ABSTRACT

A socket migration architecture for migrating a communication socket among host devices comprises a plurality of migrateable sockets each operating in conjunction with one of a plurality of applications on a plurality of host devices. Each of the applications may utilize a respective migrateable socket to establish peer-to-peer communications with at least one other application. Upon establishment of such communications, the migrateable sockets may form an association link between migrateable sockets operating on different host devices. When a first application and respective first migrateable socket are migrated from a first host device to a second host device, at least one association link established prior to the migration may be used to re-established peer-to-peer communications as part of the migration event.

43 Claims, 7 Drawing Sheets

COMMUNICATION SOCKET MIGRATION AMONG DIFFERENT DEVICES

FIELD OF THE INVENTION

The present invention relates generally to communication between devices on a network, and more particularly, to methods and systems for migrating a communication socket from a first device to a second device over the network.

BACKGROUND OF THE INVENTION

Personal electronic devices such as personal computers, personal digital assistants (PDA), wireless telephones and pagers have become prevalent in recent years. These devices may communicate over wireless and/or wireline networks using various capabilities related to data, audio and video communication. The networks provide interconnection of these devices with information sources as well as other similar devices. Commonly, the networks include communication over the Internet.

Devices communicate with each other over the network with a communication protocol. Communication protocols function as an intermediary between applications operating on the devices and the network. Exemplary communication protocols include User Datagram Protocol (UDP) and transmission control protocol (TCP) to encapsulate messages generated by applications. In addition, a network protocol such as, Internet protocol (IP) may encapsulate the communication protocol to identify the device on the network.

The network protocol utilizes a host address of each of the devices as identification to establish peer-to-peer communications between devices. In addition, a port address of each of the devices is identified by the communication protocol. The port address includes a port number identifying the nature of use of the port, such as, for example, port 80 is usually for Hypertext Transfer Protocol (HTTP) traffic. Within a port, one or more sockets may be activated by applications operating on those devices. A socket is active as a TCP socket or a UDP socket when an application operating on a device is communicatively connected by TCP or UDP with an active socket (a TCP or UDP socket) of another application operating on another device. A passive socket is one that is not currently connected with a socket of another device. Each port may have a number of active sockets corresponding to open connections on the port along with a passive socket awaiting a connection. Peer-to-peer communication between active sockets (TCP or UDP sockets) of two devices is established based on the host address and the port address of each corresponding device.

Due to the inherent mobility of many of these devices, migration of an application among different devices is possible. Migration allows an application to move from one device (a source device) to another device (a target device) while maintaining the state of the application. For example, a user working with a server-based calendar application on his desktop personal computer to plan a business trip may migrate the application to his PDA to continue working when he leaves his desk. In these situations, the application may be transferred over the network from the source device to the target device.

When such a migration occurs, active sockets of the source device, as well as active sockets of other devices communicating with source device, are closed by the respective applications prior to migration. When the active sockets are closed, peer-to-peer communications with other devices on the network is lost. Following successful migration, sockets on the target device as well as sockets on devices previously communicating with the migrated application must be reopened and peer-to-peer communications reestablished. Since the host address changes when the application is migrated, the peer-to-peer communications must be completely reestablished. This may require significant specialized programming of the applications involved in the migration to re-open the sockets and re-establish peer-to-peer communications.

Prior art solutions to avoid having to completely reestablish peer-to-peer communications involve modifying the communication protocol. The communication protocol is modified to include application related information. The application related information avoids dependence on the host address to reestablish peer-to-peer communications. As such, when an application is migrated from one device to another, the peer-to-peer communications may also be migrated. Implementation of such a solution requires the modification of standard communication protocols such as transmission control protocol (TCP) or user datagram protocol (UDP) to include the additional information. Examples of this approach are described in publications entitled "Multi-homed TCP" by C. Huitema (Internet Draft, May 1995) and "TCP Connection Migration" by H. Balakrishnan and A. C. Snoeren (Internet Draft, November 2000).

A significant issue regarding modification of the standard communication protocol is deployment. All applications operating on all devices on the network must use the exact same communication protocol to communicate. As such, all the devices must be similarly modified to maintain communication compatibility. In addition, changes to the standard communication protocol may also require modification of the operating system of devices upon which the modified communication protocol is utilized.

Aside from the issues associated with deployment, most existing standard communication protocols have been developed by standards committees to provide uniformity among applications. For example, the TCP protocol is defined in a specification entitled "Transmission Control Protocol, Darpa Internet Program, Protocol Specification" RFC-793 (September 1981). Similarly, the UDP protocol is defined in a specification entitled "User Datagram Protocol" RFC 768 (Aug. 28, 2001). It may be difficult to convince these committees to accept and implement such modified standards. Without implementation of the modified standards, maintaining uniformity as well as promoting widespread acceptance and use may prove unattainable.

SUMMARY OF THE PRESENT INVENTION

The present invention discloses a socket migration architecture to support migration of a communication socket among heterogeneous devices. Peer-to-peer communication between devices on a network may be established with communication sockets using standard communication protocols. Using the standard communication protocols, association links may be established between the devices. Following a migration event, an association link may be utilized to re-establish peer-to-peer communications. Re-establishment of peer-to-peer communications by the socket migration architecture does not entail a complete re-establishment due to the association links. As such, significant specialized coding otherwise required to completely re-establish the link is not required. In addition, since standard communication protocols are used, modification and deployment of modified communication protocols is unnecessary.

The socket migration architecture of one embodiment is operated in a communication system comprising at least one source host, at least one corresponding host and at least one target host in operable communication over a network. The socket migration architecture includes applications and migrateable sockets that may be operating on any of the hosts within the communication system. A first application operating on the source host may use a first migrateable socket to establish peer-to-peer communications over the network with a second migrateable socket operating with a second application on the corresponding host. The first and second migrateable sockets may create an association link using a communication protocol to exchange identifying information. The identifying information may identify the host on which the application is currently operating. When the first application is migrated to the target device, the first migrateable socket may also be migrated. Migration of the first migrateable socket avoids having to completely reestablish peer-to-peer communications by utilizing the association link between the first and second migrateable sockets to re-establish communications.

In one embodiment, each of the first and second migrateable sockets includes a respective first and second roam socket module and a respective first and second active socket module. The first and second roam socket modules may operate on a first layer that is the fifth, sixth or seventh layer of the well-known OSI model and the first and second active sockets may operate on a second layer that is the fourth layer of the OSI model. The first and second active sockets may operate with a communication protocol to communicate over the network and provide peer-to-peer communications. The first and second roam socket modules may be associated when the association link is created. When migration from the source host to the target host occurs, the first roam socket module may be migrated to the target host. Following migration, peer-to-peer communication may be re-established between the corresponding host and the target host with the first and second roam socket modules as a function of the association link. Peer-to-peer communication over the network may be re-established with the communication protocol by opening a third active socket with the second roam socket module and fourth active socket with the first roam socket module.

In another embodiment, the socket migration architecture includes synchronization buffers independently operating with each of the first and second migrateable sockets. In this embodiment, during a migration event, an input datastream independently received by each of the first and second roam socket modules over the network is buffered by respective synchronization buffers. Both the first migrateable socket and the buffered input datastream received thereby are migrated from the source host to the corresponding host. Upon reestablishment of peer-to-peer communication using the first and second migrateable sockets, the corresponding buffered input datastreams are independently read by the first and second migrateable sockets.

In yet another embodiment, the socket migration architecture includes association tables independently operating with each of the migrateable sockets. In addition, an address translation table operating with the second roam socket module is included in the migration architecture operating on the corresponding host. The respective association tables may be used to store identifying information when association links are created during peer-to-peer communication over the network utilizing the communication protocol. In this embodiment, a migration event includes migration of both the first migrateable socket and the association table operating in conjunction therewith. The first migrateable socket may utilize the corresponding association table to reestablish peer-to-peer communication between the target host and the corresponding host. The address translation table may be updated to map the migration from the host device to the target device and provide a cross-reference for future peer-to-peer communication.

Another interesting feature of the socket migration architecture involves freezing the input/output data between an application and the migrateable socket operating therewith. Freezing may occur during a migration event to expedite the migration process and maintain coordinated communication between host devices.

Yet another interesting feature of the socket migration architecture involves the ability to create association links with multiple host devices using the association tables. As such, following migration, peer-to-peer communications may be seamlessly reestablished with multiple applications operating on each of multiple host devices.

Still another interesting feature of the socket migration architecture involves communication during a migration event. Interruption of the peer-to-peer communications during a migration event is almost transparent and seamless for the applications involved in the event. As such, coordinated operation between the applications is maintained following the migration event and data loss is minimized.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS OF THE INVENTION

The presently preferred embodiments describe a socket migration architecture capable of migrating a communication socket associated with an application when the application is migrated among different devices. The socket migration architecture may be utilized with standard communication protocols to provide socket migration capability. Application developers of both the application being migrated and applications in communication therewith may utilize the socket migration architecture to avoid additional coding that would otherwise be needed to reestablish communication following migration. In addition, the socket migration architecture provides a temporary interruption of communication during the migration that is almost transparent to the operation of the applications involved in the event.

Figure 1:
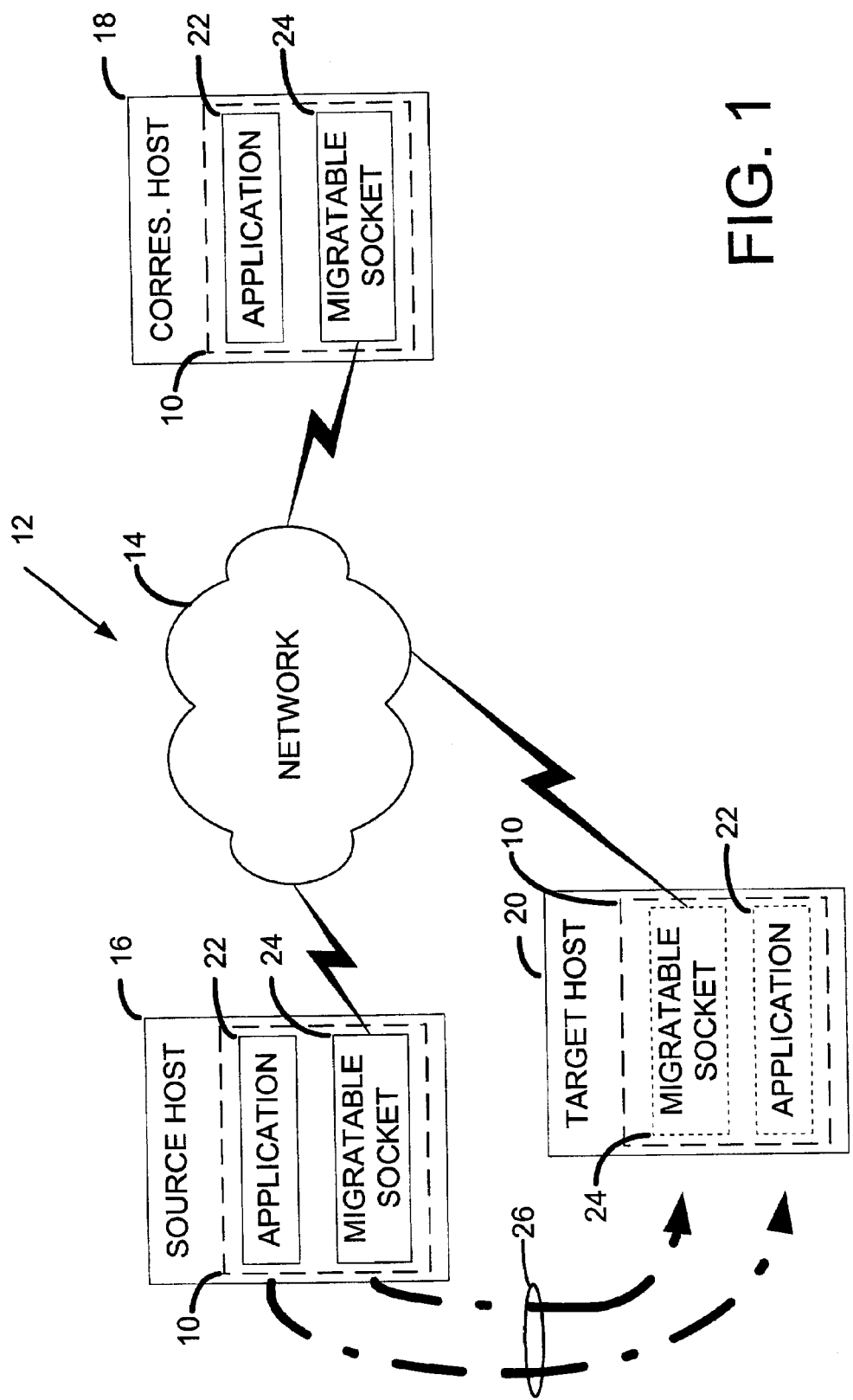
FIG. 1 is a block diagram of a communication system that includes an embodiment of a socket migration architecture.

FIG. 1 is a block diagram of one embodiment of a socket migration architecture 10 operating within a communication system 12. The communication system 12 includes a network 14, at least one first host which is a source host 16, at least one second host which is a corresponding host 18 and at least one third host which is a target host 20 operative coupled as illustrated. The socket migration architecture 10 includes at least one application 22 and at least one migrateable socket 24. The socket migration architecture 10 may operate on any of the hosts 16, 18, 20 as later described in detail. As used herein, the term "coupled" or "connected" may mean electrically coupled, optically coupled or any other form of coupling providing an interface between devices and/or components.

The network 14 may include the Internet, a public and/or private intranet, an extranet, and/or any other form of network configuration to enable transfer of data and commands. Communication within the network 14 may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data, audio and/or video.

The source host 16, the corresponding host 18 and the target host 20 may be any type of computing device or similar hardware capable of providing a connection for communicating over the network 14. For example, the source host 16, the corresponding host 18 and the target host 20 may be a wireless device, such as, a wireless phone, a personal digital assistant (PDA) or any other device capable of wireless communication. In addition, the source host 16, the corresponding host 18 and the target host 20 may be a wireline device, such as, for example, a personal computer, a server computer or any other device capable of wireline communication over the network 14. In other embodiments, devices may include both wireline and wireless communication capability. Although only three host devices are illustrated in FIG. 1, any number of host devices may be communicating on the network 14 and using the socket migration architecture 10.

In the illustrated embodiment, the source host 16, the corresponding host 18 and the target host 20 may each include the socket migration architecture 10. Data communicated over the network 14 by the hosts 16, 18, 20 may be generated by, and directed to, applications 22 operating on the hosts 16, 18, 20.

Applications 22 in the form of software, firmware or some other form of computer code may include an operating system and/or any other applications the hosts 16, 18, 20 are capable of running. As used herein, the term "application" may refer to an executable program and/or any accompanying data files operated with an executable program. For example, a user may activate a host 16, 18, 20 such as a wireless phone. When the wireless phone is activated, an application 22 is launched to provide the functions available from the wireless phone such as dialing and receiving phones calls. In addition, the user may initiate other applications 22 such as, interactive messaging, an Internet browser, email services, stock market information services, music services or any other functionality operable with the host 16, 18, 20.

In the presently preferred embodiments of the socket migration architecture 10, the applications 22 are capable of being migrated. Migration of an application 22 involves moving an instance of the operating application from a source device to a target device. The descriptive nomenclature used for the "source" host 16 and the "target" host 20 is used to further illustrate the migration concept. In addition, the "corresponding" host 18 is so identified to indicate peer-to-peer communication with the source host 16 prior to a migration event, and with the target host 20 following a migration event.

Each of the applications 22 preferably utilize migrateable sockets 24 to establish communications over the network 14 with other applications 22. The migrateable sockets 24 operate within the hosts 16, 18, 20 to provide an interface between the applications 22 and the network 14. The migrateable sockets 24 may utilize the ports, sockets and any other conventional communication related components within the hosts 16, 18, 20 to communicate over the network 14. The operation of the migrateable sockets 24 may be based on the operation of applications 22 operating within the hosts 16, 18, 20.

The applications 22 may communicate with each other over the network 12 creating peer-to-peer communications. The peer-to-peer communications are created with "peer" migrateable sockets 24. As used herein, the term "peer" migrateable sockets 24 refers to migrateable sockets 24 associated with applications 22 operating on different hosts 16, 18, 20 that have formed peer-to-peer communications. For example, the source host 16 may launch an application 22 that is a client application such as an email application. The client application may initiate communication with an application 22 on the corresponding host 18 that is a server application, such as an email server application.

The peer migrateable sockets 24 may form an association link between the applications 22. The association link is based on identifying information exchanged between migrateable sockets 24. The number of applications 22 linked by peer migrateable sockets 24 may be two or more depending on the applications 22 and the communication protocol. The identifying information provides the identity of the host 16, 18, 20 upon which the applications 22 are currently operating. The identifying information may be a hostname and port number pairs or any other type of device or resource specific information capable of identifying a host 16, 18, 20 within the communication system 12.

In the presently preferred embodiments, a respective migrateable socket 24 operates in conjunction with an application 22 launched on a respective host 16, 18, 20. As such, the migrateable socket 24 may be migrated along with the application 22 from one heterogeneous host device to another. As described later in detail, migration of a peer migrateable socket 24 does not extinguish the association link between applications 22; rather, peer-to-peer communication between the applications may be temporarily suspended. Once the migration is complete, the peer migrateable sockets 24 reestablish the previous peer-to-peer communication between the applications 22 based on the association link. Maintaining the association link between the applications 22 following migration may maintain continuity and expedite resumption of operation of the instance of the application 22 that was migrated.

During operation of the communication system 12, applications 22 may be launched on the source host 16 and the corresponding host 18. The applications 22 may utilize associated peer migrateable sockets 24 to form an association link between the applications 22. For example, the source host 16 may be a desktop computer launching a video on-demand application and the corresponding host 18 may be a server computer running a video streaming server application.

Upon migration of an application 22 operating on the source host 16 to the target host 20, the migrateable socket 24 associated with the application 22 may also be migrated as illustrate by arrows 26 in FIG. 1. If, for example, a user attending the video on-demand via the source host 16 had to travel to another location, the video on-demand application and associated migrateable socket 24 may be migrated to the user's PDA (the target host 20). Migration of the migrateable socket 24 suspends communication between the applications 22 operating on the source host 16 and the corresponding host 18, and resumes communication between the same applications 22 operating on the corresponding host 18 and the target host 20 following the migration event.

Through the use of the socket migration architecture 10, the communication between the applications 22 may be seamlessly reestablished following migration. In addition, migration by the migrateable sockets 24 is almost transparent to both the migrating application 22 and the application 22 operating on the corresponding host 18. As such, the socket migration architecture 10 provides application programmers a fairly simple implementation that avoids significant coding of the applications 22 that would otherwise be necessary to create new peer-to-peer communications following the migration event.

Figure 2:
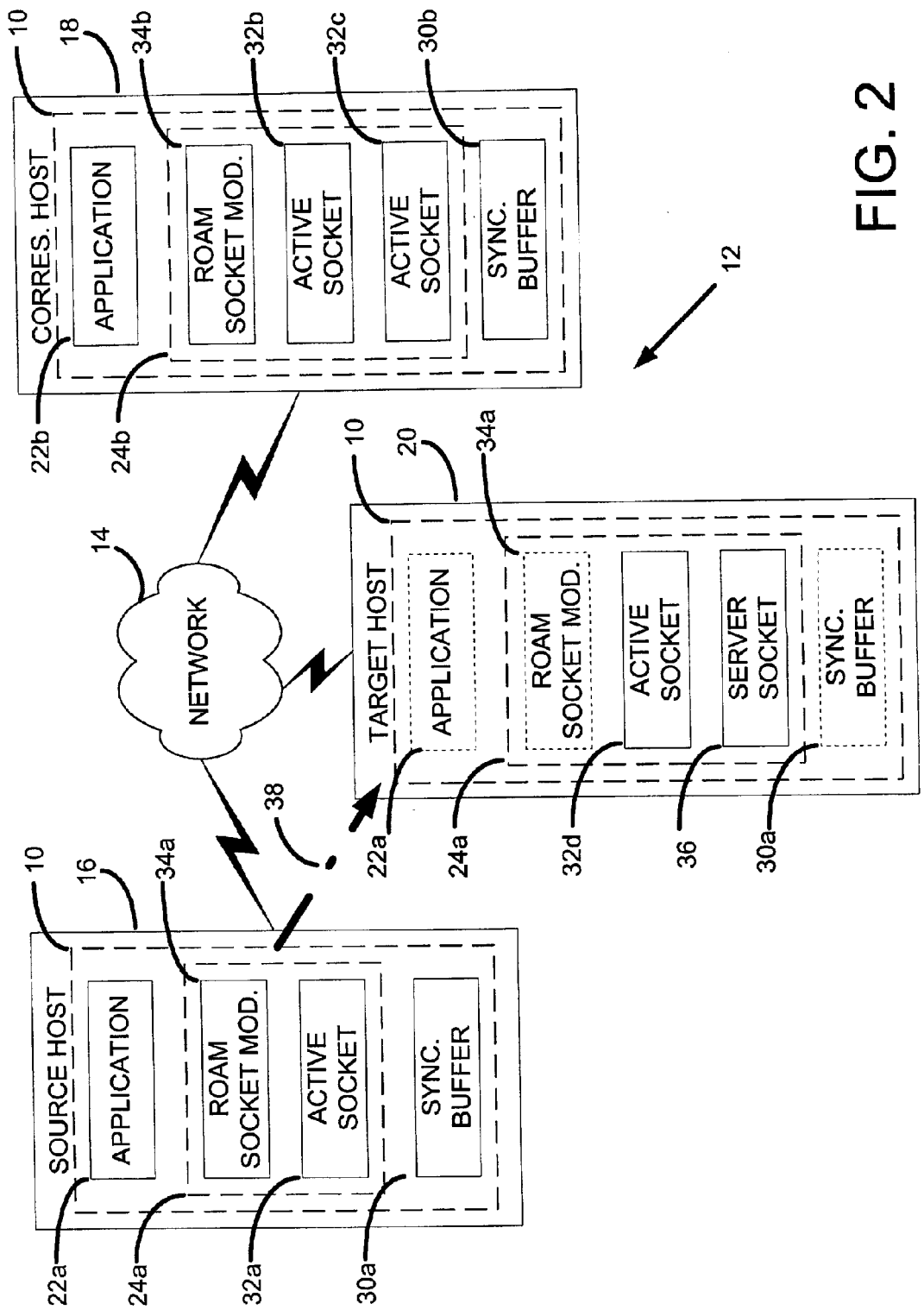
FIG. 2 is a more detailed block diagram of the communication system illustrated in FIG. 1 and an embodiment of the socket migration architecture.

FIG. 2 is a more detailed block diagram of the embodiment of FIG. 1 illustrating another embodiment of the socket migration architecture 10 operating within the communication system 12. As in the previous embodiments, the communication system 12 includes the network 14, at least one first host which is the source host 16, at least one second host which is the corresponding host 18 and at least one third host which is the target host 20. In addition, the socket migration architecture 10 is operating within the communication system 12.

The socket migration architecture 10 of this embodiment includes applications 22 and migrateable sockets 24 as in the previous embodiments. In addition, the socket migration architecture 10 includes synchronization buffers 30. The synchronization buffers 30 may be any storage medium capable of storing sequentially received data. As described later in detail, the synchronization buffers 30 cooperatively operate with peer migrateable sockets 24 during operation of the socket migration architecture 10 to store data transmitted between applications 22 over the network 14.

In the illustrated embodiment, the socket migration architecture 10 includes a first application 22a operating on the source host 16 with a first migrateable socket 24a and a first synchronization buffer 30a. In addition, the socket migration architecture 10 includes a second application 22b operating on the corresponding host 18 with a second migrateable socket 24b and a second synchronization buffer 30b. The first and second applications 22a, 22b may establish peer-to-peer communications and create an association link with the first and second migrateable sockets 24a, 24b. Identifying information on which the association link is based is exchanged between the first and second migrateable sockets 24a, 24b over the network 14.

In this embodiment, the association link established by the first and second migrateable sockets 24a, 24b between the first and second applications 22a, 22b is established with a transmission control protocol (TCP) connection. The TCP connection is a virtual pipeline opened over the network 12 between peer migrateable sockets 24 (first and second migrateable sockets 24a, 24b). The TCP connection provides a communication channel through which the first and second applications 22a, 22b may transmit and receive data. The TCP connection may include two socket peers, which are the first and second migrateable sockets 24a, 24b. In other embodiments, any other communication protocols with reliable, stream-oriented characteristics forming a connection between peers may be utilized.

TCP is an industry standard communication protocol in which each TCP socket peer is associated with a port on a host device. The TCP communication protocol may encapsulate a message protocol, such as, for example hypertext transfer protocol (HTTP) to provide connection management and reliable delivery of the message protocol. The message protocol and the TCP communication protocol may be further encapsulated by a network protocol to identify the devices upon which each TCP socket peer resides. An exemplary network protocol is the Internet protocol (IP). The network protocol may provide identification of the host on which the TCP socket peer is operating. For example, the IP network protocol forms a header for the TCP protocol which includes a host IP address. The standard communication protocol of TCP fails to provide provisions for changing the host IP address and the port address of a TCP socket peer once the TCP connection has been established between two peers. Standard communication protocols such as TCP operate on a transport layer of an OSI model and network protocols such as IP operate on a network layer. As known in the art, the OSI model is an abstract model of networking that identifies seven layers.

In the presently preferred embodiments, each of the migrateable sockets 24 may include an active socket 32 and a roam socket module 34. The active socket 32 may be a conventional TCP socket peer operating in the fourth layer (L4) of the OSI model. The active socket 32 may operate to send and receive datastreams flowing through the TCP connection formed between peer migrateable sockets 24. TCP socket peers may operate in conjunction with an application 22 to transmit an output datastream over the network 14 based on data supplied by the corresponding application 22. In addition, TCP socket peers may receive an input datastream from the network 14 directed to the corresponding application 22. Operation of the active socket 32 as a TCP socket peer includes buffering of input and output datastreams, sliding window flow control, full duplex operation, round trip time estimation and other well-known features of the TCP communication protocol.

The active socket 32 may establish a TCP connection with a peer TCP socket using three-way handshaking with a host address and a port address of the host 16, 18, 20 on which the application 22 is currently operating. As known in the art, conventional establishment of a TCP connection involves initiation of contact between a client application and a server application with a server socket. The client application or the server application may open a server socket to initiate contact. Initiation of contact is performed with a three-way handshake directed to the server socket. The three-way handshake is part of the standard TCP communication protocol and is transparent to both the client and the server applications. In response to the initiation of contact via the server socket, a socket may be opened and a TCP connection between the sockets of the client application and the server application is formed. In the embodiments described herein, any of the applications 22 may operate as server applications or client applications with sockets that may be the active sockets 32. In addition, any application 22 operating as a server application may include a server socket.

In one embodiment, the active sockets 32 are Java TCP sockets instantiated with a Java TCP socket Application Programming Interface (API). Java is a well-known object-oriented programming language that may be operated on any device capable of supporting a Java virtual machine (VM). As known in the art, Java APIs are a large collection of ready-made software components providing a wide range of functionality within Java based applications. In this embodiment, the active sockets 32 may be Java TCP sockets instantiated with java.net.socket. In other embodiments, the active sockets may be instantiated with UNIX C or any other programming language.

Each of the roam socket modules 34 may be associated with one of the active sockets 32 to provide migration capability. In the presently preferred embodiments, the roam socket modules 34 provide an abstract TCP connection between two TCP socket peers, where each of the two TCP socket peers is an active socket 32 within a peer migrateable socket 24. Accordingly, each of the roam socket modules 34 associated with the TCP socket peers may be described as "peer" roam socket modules 34.

Establishment of the abstract TCP connection is provided through establishment of the association link. In one embodiment, the association link may be created by the exchange of object references between peer roam socket modules 34. The object reference of each of the roam socket modules 34 includes identifying information. In other embodiments, an execution state of the peer roam socket modules 34 may be exchanged over the TCP connection. In still other embodiments, a host address and a port address of the host device on which each of the peer roam socket modules 34 is operating may be exchanged over the TCP connection. In addition, in other embodiments, any other information may be exchanged between peer roam socket modules 34 that provides identification of the communication path between applications operating on hosts 16, 18, 20 in the network 14.

The abstract TCP connection allows migration of the migrateable socket 24 between the hosts 16, 18, 20 while maintaining an abstract connection between peers. In other words, one of the peer migrateable sockets 24 may change hosts 16, 18, 20 (e.g. host address/port address) while maintaining an abstract TCP connection with a peer migrateable socket 24 instantiated on another device. As such, associated TCP connection(s) may be effectively migrated along with the applications 22.

Operation of the roam socket module 34 may be in layers five—L5 (the session layer), six—L6 (the presentation layer) and/or seven—L7 (the application layer) of the OSI model. As such, the roam socket module 34 does not modify the TCP communication protocol utilized by the associated active socket 32 operating in level four. Instead, the roam socket module 34 is built on top of the active socket 32 to encapsulate and direct the overall operation of the active socket 32.

In the embodiment illustrated in FIG. 2, the first migrateable socket 24a may include a first active socket 32a and a first roam socket module 34a. In addition, the second migrateable socket 24b may include a second active socket 32b and a second roam socket module 34b. The first and second roam socket modules 34a, 34b may direct the opening and closing of the respective first and second active sockets 32a, 32b. In addition, the first and second roam socket modules 34a, 34b may control the flow of input data and output data between the respective first and second applications 22a, 22b and the respective first and second migrateable sockets 24a, 24b. Further, the first and second roam sockets modules 34a, 34b may communicate over the network 14 using the first and second active sockets 32a, 32b.

For example, in the illustrated embodiment, the first and second applications 22a, 22b may use the respective first and second roam modules 34a, 34b to open the respective first and second active sockets 32a, 32b. The first and second active sockets 32a, 32b may become TCP socket peers by establishing a TCP connection. The first and second roam socket modules 34a, 34b may create an association link using the TCP connection established between the TCP socket peers (first and second active sockets 32a, 32b). Identifying information on which the association link is based may be exchanged between the first and second roam modules 34a, 34b. For purposes of fully describing the functionality and components, this exemplary TCP connection will be used in the discussion that follows. It should be realized, however, that any other applications operating on host devices in the communication system 12 may form a TCP connection.

The roam socket module 34 may also operate to avoid data loss (e.g. packet loss) during migration of an application 22 and associated TCP data connection. Data loss during migration is avoided by cooperative operation of the migrateable sockets 24 and the synchronization buffers 30 operable therewith. If, for example, the first application 22a is about to migrate, the first roam socket module 34a may direct the first active socket 32a to close. During the standard close process for a TCP connection, the first active socket 32a may send a close message to the TCP socket peer (for example second active socket 32b), flush data buffered in the first active socket 32a and await an end-of-file indication from the TCP socket peer. Upon receiving the end-of-file indication, the first active socket 32, as well as the TCP socket peer may delete the TCP connection and close.

In addition to directing the active sockets 32 forming the TCP connection to close, each of the roam socket modules 34 may also freeze the flow of input/output (I/O) data to/from an application 22 operating therewith. In effect, the frozen applications 22 are suspended from reading and writing data to the migrateable sockets 24 during the migration event. In one embodiment, read and write calls between an application 22 and a migrateable socket 24 operating therewith are directed through the roam socket module 34 as input data and output data, respectively. When the application 22 is frozen, the roam socket module 34 may block the flow of input and output data until the migration is complete.

In the presently preferred embodiments, the speed and efficiency of the migration event may be increased by freezing the input and output data prior to completion of the close of the TCP connection. Accordingly, preparation for the migration event is not delayed while the input datastream containing the data flushed from the TCP socket peer is transmitted over the network 14. In addition, delay while awaiting processing to reach the end of file message, as well as during transmittal over the network 14 of acknowledgement of receipt of the flushed data may be avoided.

The reliability of data transfer with the TCP communication protocol by the active sockets 32 is not compromised by the socket migration architecture 10. The active sockets 32 receive the input datastream containing the flushed data until the end of file indication is reached. In addition, acknowledgment of receipt occurs prior to closing the TCP socket peers using the standard TCP communication protocol.

Since the flow of input/output data may be frozen prior to closing the active socket 32, the input datastream provided by the peer TCP socket during closing is not directed to the application 22. Instead, the roam socket module 34 may direct the input datastream to the synchronization buffer 30. As such, any input datastream received by the migrateable socket 24 over the TCP connection while the application 22 is frozen may be reliably captured within the synchronization buffer 30. Effectively, through the capture of this data, the migration event is fast and efficient while maintaining transparency of the migration to both the migrated application 22 as well as the application 22 communicating with the migrated application 22 over the network 14.

Migration of the application 22 among the hosts 16, 18, 20 includes migration of the roam socket module 34 and the synchronization buffer 30 operating in conjunction therewith. For example, in the embodiment illustrated in FIG. 2, the first application 22a, the first roam socket module 34a and the first synchronization buffer 30a may be encoded and migrated over the network 14 from the source host 16 to the target host 20 as illustrated by arrow 38. Migration is further illustrated in FIG. 2 by the dotted boxes representing the first application 22a, the first roam socket module 34a and the first synchronization buffer 30a in the target host 20. Following migration, the first application 22a, the first roam socket module 34a and the first synchronization buffer 30a may be decoded and a server socket 36 may be instantiated to reestablish the TCP connection.

In one embodiment, Java applications are used. In this embodiment, the running state of the first roam socket module 34a and the first synchronization buffer 30a are serialized, transmitted, de-serialized, and the server socket 36 is instantiated. The server socket 36 of this embodiment may be a standard Java TCP server socket instantiated with java.net.ServerSocket. In other embodiments, other programming languages may be used to instantiate the server socket 36. As known in the art, serialization/deserialization of Java sockets is not possible. In one embodiment, methods for serialization and de-serialization of the execution state of the first roam socket module 34a (or any other roam socket module 34) provide socket specific serialization and de-serialization. In other embodiments, file compression techniques, table based encoding and decoding or any other form of data manipulation and transfer may be utilized for encoding/decoding and transmission over the network 14.

Following migration and instantiation of the server socket 36, the migrated first roam socket module 34a may function as an abstract TCP connection by directing the server socket 36 to reinitiate communication over the network 14. The server socket 36 is directed to reinitiate communication with a peer roam socket module 34 operating on another host 16, 18, 20. In the illustrated embodiment, the roam socket module 34 that was a peer prior to the exemplary migration event was the second roam socket module 34b. The migrated first roam socket module 34a may utilize the association created with the association link to reestablish communication using the server socket 36. In other words, the identifying information is provided to the server socket 36 to contact the second roam socket module 34b operating on the corresponding host 18.

In one embodiment, the server socket 36 instantiated by the first roam socket module 34a is a Java server socket instantiated with java.net.ServerSocket. The Java server socket may initiate communication by transmitting a port address and a host address to the corresponding host 18 on which the second roam socket module 34b and associated second application 22b are operating. In this embodiment, transmission may be performed with Java remote method call (RMI). Identification of the corresponding host 18 on which the second roam socket module 34b is operating is provided by the object reference of the second roam socket module 34b. The object reference was provided by the association link established prior to the migration event. In other embodiments, other methods and mechanisms may be used for identification of the corresponding host 18 as well as transmission to initiate communication.

Upon contacting the corresponding host 18 with the server socket 36, a third active socket 32c on the corresponding host 18 may be opened. The third active socket 32c and the server socket 36 may provide a communication path between the first roam socket module 34a and the second roam socket module 34b. The communication path allows the first roam socket module 34a to transmit identifying information to the second roam socket module 34b. The second roam socket module 34b may provide the identifying information to the third active socket 32c. The third active socket 32c may utilize the identifying information to communicate with the server socket 36 using standard TCP three-way handshaking and initiate reestablishment of the TCP connection. During the handshaking, a fourth active socket 32d may be opened on the target host 20 to reestablish the TCP connection between the target host 20 and the corresponding host 18 as in conventional TCP communication protocol. Once the TCP connection is reestablished, the association link is also reestablished through exchange of current identifying information between the peer roam socket modules 34.

Prior to transferring input datastreams from the reestablished TCP connection to the first and second applications 22a, 22b, the flushed data buffered in the first and second synchronization buffers 30a, 30b is provided to the respective applications 22a, 22b. The flushed data is extracted by respective first and second roam socket modules 34a, 34b and provided as input data to the respective first and second applications 22a, 22b. As such, the first and second applications 22a, 22b are provided data in transmission sequence order without loss of data.

During operation, when an application 22 is launched on a host 16, 18, 20, the roam socket module 34 creates the active socket 32. In one embodiment where the roam socket module 34 is a Java application, the active socket 32 is a Java TCP socket. In this embodiment, the APIs of the roam socket module 34 includes a wrapper class to extend java.net.socket operating the active socket 32. In addition, the roam socket module 34 includes a wrapper class to extend java.net.ServerSocket when the server socket 36 is instantiated following migration. The wrapper classes of this embodiment preferably include a method interface similar to the corresponding classes being wrapped so that implementation of the wrapper classes by application developers may be simplified.

Figure 3:
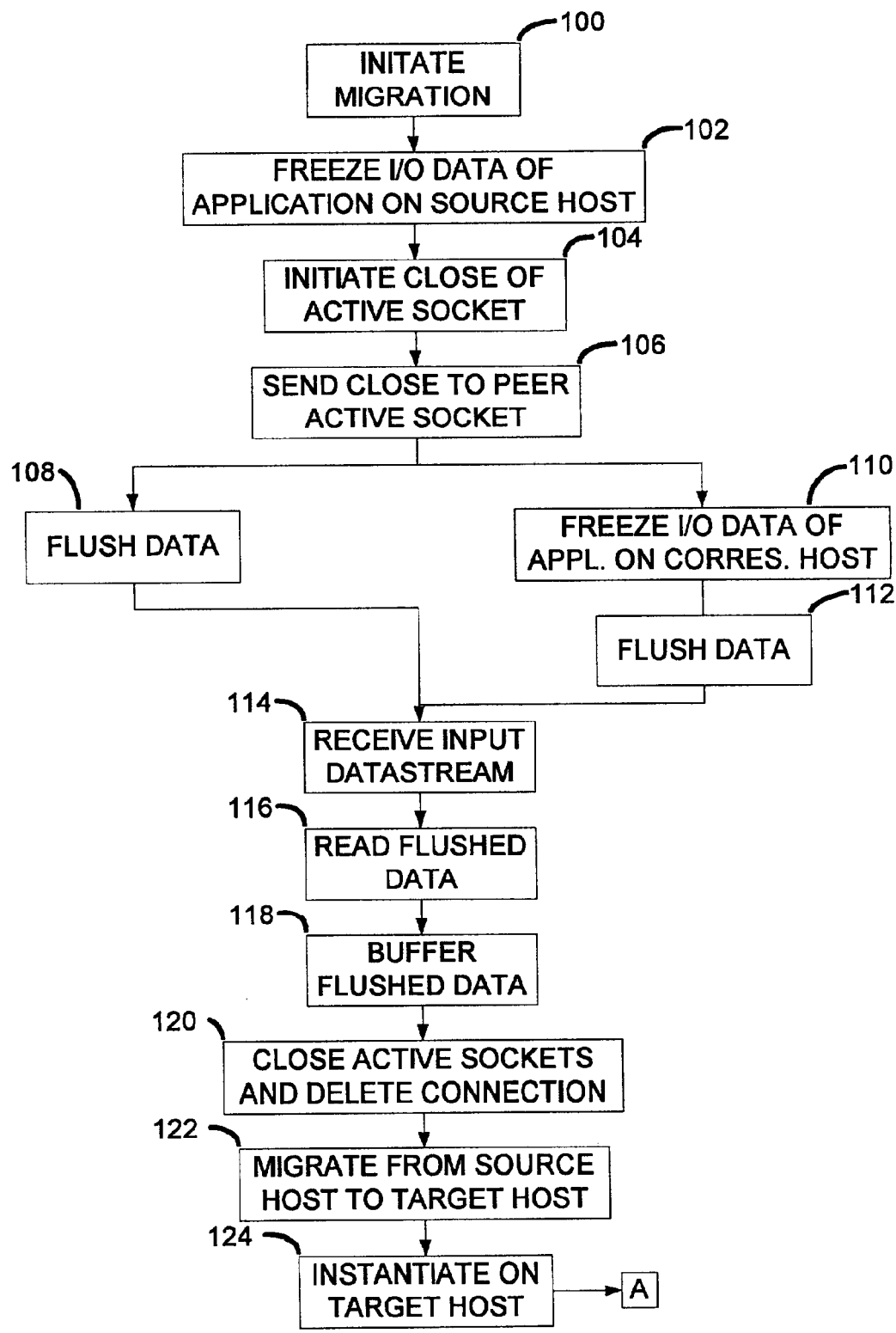
FIG. 3 is a flow diagram illustrating operation of the socket migration architecture within the communication system depicted in FIG. 2.

FIG. 3 is a flow diagram illustrating operation of the socket migration architecture 10 illustrated in FIG. 2 during a migration event. For purposes of illustrating operation, the first application 22a may be migrated from the source host 16 to the target host 20. In addition, the TCP connection may be migrated in an abstract form by migration of the first migrateable socket 24a.

The operation begins at block 100 when migration of the first application 22a from the source host 16 to the target host 20 is initiated. At block 102, the I/O data flow of the first application 22a on the source host 16 is frozen by the first roam socket module 34a. The first roam socket module 34a initiates closing of the first active socket 32a at block 104. At block 106, the first active socket 32a sends a close message to the peer active socket 32 operating on the corresponding host 18 (second active socket 32b). Data is flushed from the first active socket 32a at block 108. At block 110 a peer roam socket module 34 operating on the corresponding host 18 (second roam socket module 34b) freezes the I/O data flow of an application 22 operating on the corresponding host 18 (second application 22b) based on the close message. In addition, at block 112 flushing of the peer active socket 32 on the corresponding host (second active socket 32b) is initiated based on the close message.

At block 114, the peer active sockets 32 on the source host 16 and the corresponding host 18 (first and second active sockets 32a, 32b, respectively) receive respective input datastreams containing flushed data. The flushed data is read by the peer roam socket modules 34 on the source host 16 and the corresponding host 18 (first and second roam socket modules 34a, 34b, respectively) at block 116. At block 118, the flushed data is stored in a respective synchronization buffer 30 within the source host 16 and the corresponding host 18 (first and second synchronization buffers 30a, 30b, respectively).

The peer active sockets 32 on the source host 16 and the corresponding host 18 (first and second active sockets 32a, 32b, respectively) close and delete the TCP connection at block 120. At block 122, the first application 22a, the first roam socket module 34a and the first synchronization buffer 30a operating on the host source 16 are migrated to the target host 20 as illustrated by arrow 38 in FIG. 2. The first application 22a, the first roam socket module 34a and the first synchronization buffer 30a are instantiated on the target host 18 at block 124.

Figure 4:
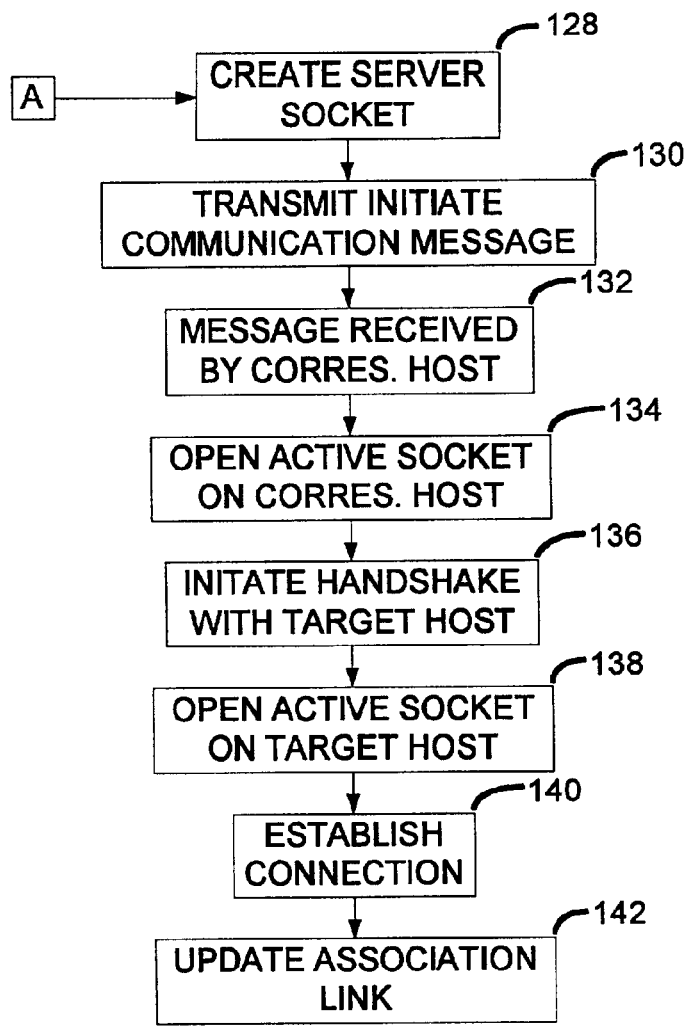
FIG. 4 is second portion of the flow diagram illustrated in FIG. 3.

Referring now to FIG. 4, at block 128, the first roam socket module 34a creates the server socket 36 on the target host 18 on a system allocated port address. The server socket 36 is directed by the first roam socket module 34a to transmit an initiate communication message over the network 14 at block 130. The message is received by corresponding host 18 based on the identifying information provided by the first roam socket module 34a at block 132.

At block 134, an active socket 32 (third active socket 32c of FIG. 2) is opened on the corresponding host 18 by the second roam socket module 34b. The third active socket 32c initiates three-way handshaking with the server socket 36 on the target host 20 at block 136. At block 138, an active socket 32 is opened on the target host 20 (fourth active socket 32d of FIG. 2). The TCP connection is established between the fourth active socket 32d on the target host 20 and the third active socket 32c on the corresponding host 18 at block 140. At block 142, the association link is updated by exchanging identifying information between the first and second roam socket modules 34a, 34b operating on the target host 20 and the corresponding host 18.

Figure 5:
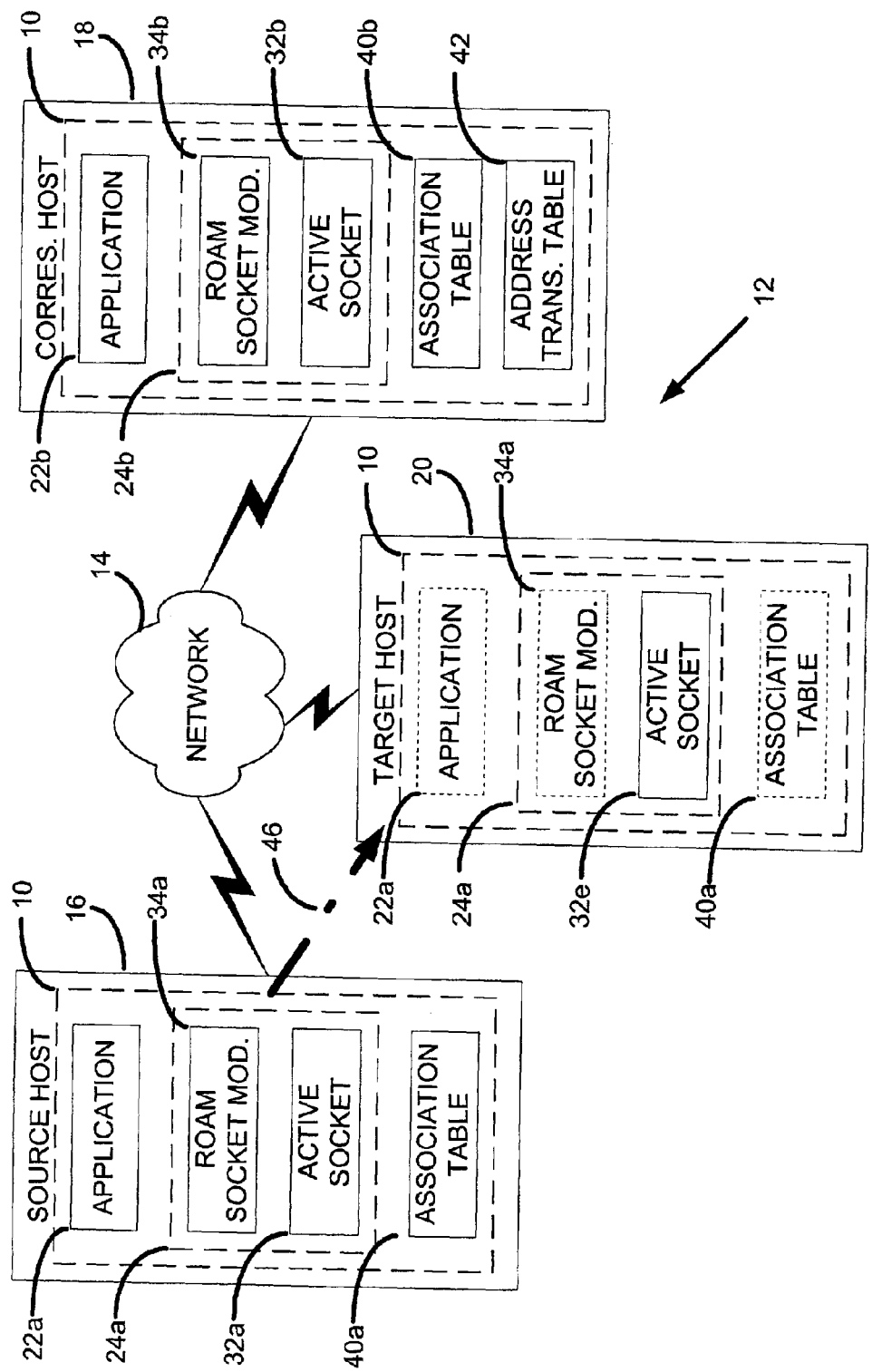
FIG. 5 is a block diagram of a communication system that includes another embodiment of the socket migration architecture.

FIG. 5 illustrates a block diagram of another embodiment of the communication system 12 that includes the socket migration architecture 10. The communication system 12 includes at least one first host device which is the source host 16, at least one second host device which is the corresponding host 18 and at least one third host device which is the target host 20 operably coupled by a network 14 as in the previous embodiments. In addition, the socket migration architecture 10 includes applications 22 and migrateable sockets 24. Further, the migrateable sockets 24 each include an active socket 32 and a roam socket module 34 as in the previous embodiments. The socket migration architecture 10 of this embodiment also includes an association table 40 operating in conjunction with each of the migrateable sockets 24. Although only three hosts 16, 18, 20 are illustrated in FIG. 5, any number of host devices may be similarly configured in the communication system 12.

In the illustrated embodiment, the socket migration architecture 10 operating within the source host 16 may form an association link with the corresponding host 18. In these embodiments, the source host 16 includes a first application 22a, a first association table 40a and a first migrateable socket 24a. The first migrateable socket 24a includes a first active socket 32a and a first roam socket module 34a. In addition, the corresponding host 18 includes a second application 22b, a second association table 40b and a second migrateable socket 24b. The second migrateable socket 24b similarly includes a second active socket 32b and a second roam socket module 34b.

The association link may be formed by associating the first migrateable socket 24a with the second migrateable socket 24b via peer-to-peer communication over the network 14 using a communication protocol. In this embodiment, the communication protocol is a user datagram protocol (UDP) communicated over the network 14 with the first and second active sockets 32a, 32b. Similar to the TCP communication protocol, the UDP communication protocol is an industry standard communication protocol that operates with the active sockets 32 in the fourth layer (the transport layer) of the OSI model. The first and second active sockets 32a, 32b operate as UDP socket peers using UDP encapsulated by IP to identify the port address and the host address of the host devices 16, 18, 20 on which the peers are operating. An exemplary utilization of UDP is with voice or multimedia information transmission, however, UDP may be used anywhere data packets are transmitted over the network 14.

Unlike TCP, however, UDP is connectionless. A UDP socket can send and receive data packets (called datagrams) from other UDP sockets without an explicit TCP-like connection establishment. Given that UDP does not require any connection setup with other UDP sockets, a UDP socket specifies peer UDP socket addresses in the form of host address and port address pairs for each outgoing data packet. Exemplary UDP sockets include a Java UDP socket instantiated with a connect( ) method in the Java UDP class java.net.DatagramSocket, and a UNIX UPD socket instantiated with a connect( ) system call in B SD UNIX.

Although UDP is connectionless, migration of the migrateable sockets 24 along with the associated applications 22 is preferable. Migration of the migrateable sockets 24 may provide transparency of migration events to the application developers as well as the applications 22 themselves. Similar to the previous embodiments involving TCP, the roam socket modules 34 of this embodiment operate on top of the active sockets 32 in the fifth, sixth or seventh layer (the session, presentation or application layer, respectively) of the OSI model thereby avoiding changes to the standard UDP communication protocol and operating systems of the host devices.

In one embodiment, the roam socket modules 34 are instantiated with Java applications. In this embodiment, the Java application method for the roam socket modules 34 may be a wrapper class which extends java.net.DatagramSocket. The wrapper class may be designed to have a similar method interface to java.net.DatagramSocket. As such, application developers may more easily apply the wrapper class when implementing migratability into applications being developed.

The roam socket modules 34 utilize the peer active sockets 32 for peer-to-peer communication with peer roam socket modules 34. In addition, the roam socket modules 34 provide socket-layer association between UDP socket peers (first and second active sockets 32a, 32b).

The association link between UDP socket peers of the presently preferred embodiments provides for multiple associations. In addition, the association links do not involve any actual connection establishment such as TCP-like connection handshaking between two TCP socket peers. Instead, the association links simply mean that UDP sockets may receive and send packets from/to associated UDP socket peers. As such, the roam socket modules 34 of these embodiments may create an abstract UDP association between associated UDP socket peers (active sockets 32) such that any socket peer(s) can change host/port attachment while maintaining an abstract UDP association with any number of peer(s). The abstract association created between applications 22 is created with identifying information as in the previous embodiments.

The abstract association may provide a virtual connection. The virtual connection may be created without any explicit connection setup. Instead, the association link may be triggered by an exchange of messages between peer roam socket modules 34.

An exchange of messages provides identifying information that may be utilized following a migration event. The identifying information provided to form the association link is preferably stored in the association tables 40. Each of the association tables 40 operate in conjunction with a roam socket module 34 on a host device 16, 18, 20. In one embodiment, the identifying information stored in the association table 40 includes addresses. The addresses identify the location of host devices 16, 18, 20 in the network 14 upon which previously associated roam socket modules 34 are operating. For example, the first and second association tables 40a, 40b may each include the host address of the corresponding host 18 and the source host 16, respectively, where the first and second roam socket modules 34a, 34b have been previously associated.

In the presently preferred embodiments, a roam socket module 34 desiring to request an association link may wait for a data packet (datagram) from a roam socket module 34 to which the desired request will be made. Upon receipt of such a data packet, an association request may be transmitted. Upon receiving such an association request message, the roam socket module 34 may determine whether to accept or reject the request. The determination may be based on, for example, the application 22, the user operating the application 22 or any other factors. Acceptance or rejection of the request may be provided in an association acknowledgment message transmitted to the requesting roam socket module 34. If accepted, message exchanges containing identifying information may be initiated to establish the association link.

Since UDP is an unreliable communication protocol, the request and/or the request acknowledgement messages may be dropped within the network 14. To allow the association between roam socket modules 34 to remain as asynchronous as possible, time-out mechanisms are preferably not used for retransmission of requests. Instead, additional packets of data being received when an association acknowledgment message is expected triggers retransmission. In other embodiments, other forms of error checking may be utilized including time-out mechanisms.

In the illustrated embodiment, the association link may be formed between the first roam socket module 34a and the second roam socket module 34b. In other embodiments, however, additional association links may be created with other migrateable sockets 24 operating as UDP sockets. The migrateable sockets 24 of these embodiments provide functionality that changes the traditional definition of socket peer association among UDP sockets as defined, for example, in Java and BSD UNIX. The change allows a UDP socket to be associated with more than one UDP socket peer. Accordingly, the migrateable sockets 24 allow migration support for applications such as, for example, a Chat Room, where one UDP socket may be associated with multiple UDP socket peers. In addition, the socket migration architecture 10 provides the functionality to track migration events and update the current location within the communication system 12 when an application 22 and migrateable socket 24 operating therewith migrate from host device to host device.

Figure 6:
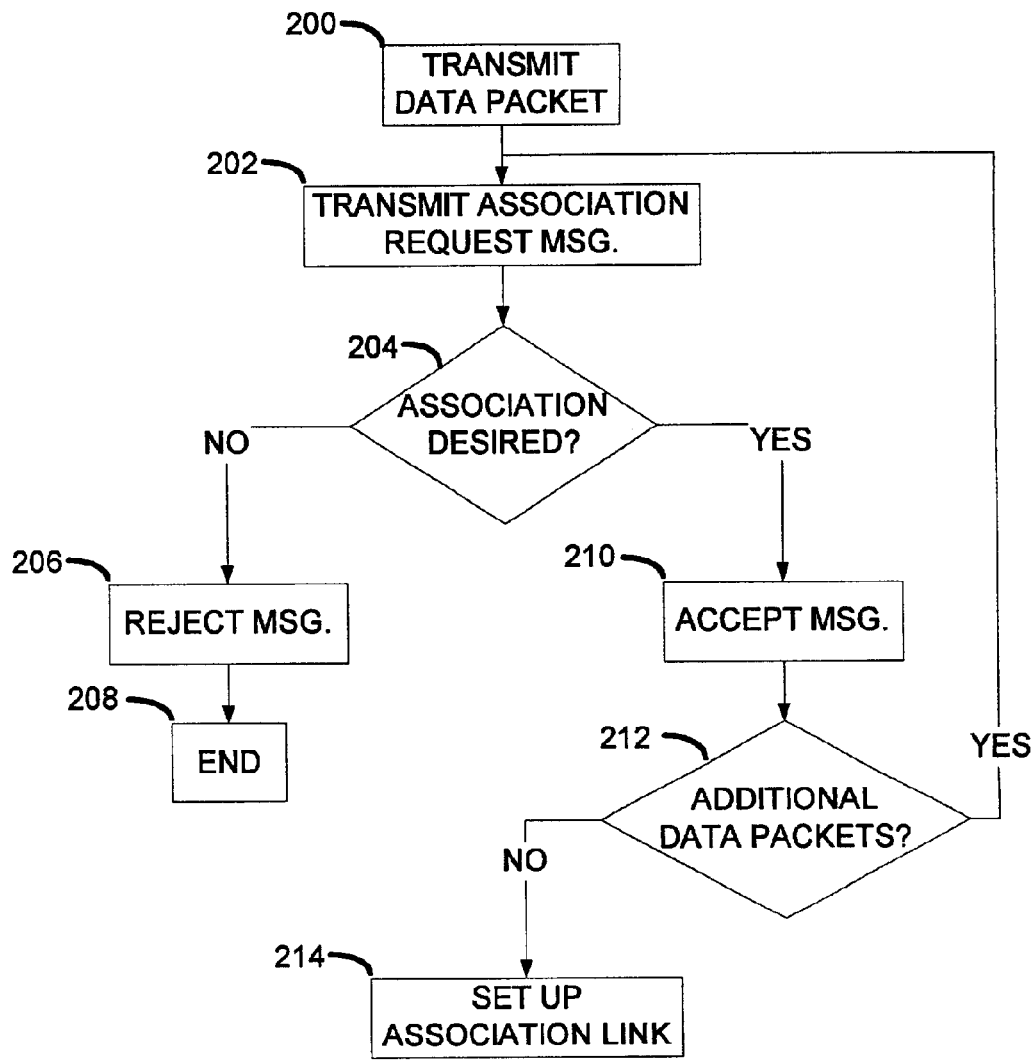
FIG. 6 is a flow diagram illustrating setup of the socket migration architecture within the communication system depicted in FIG. 5.

FIG. 6 is a block diagram illustrating the operation of the socket migration architecture 10 to associate the migrateable sockets 24 within the communication system 12 illustrated in FIG. 5. For purposes of illustrating operation, the second application 22b and the second migrateable socket 24b operating on the corresponding host 18 may begin communication over the network 14 with the first application 22a and the first migrateable socket 24a operating on the source host 16. In addition, a host address or other identifying information may be provided to the socket migration architecture 10 operating on the corresponding host 18 to identify the source host 16 on the network 14. In other examples of operation, any application 22 operating on any host device may be associated with any number of other applications operating on other host devices.

Referring to FIGS. 5 and 6, the operation begins at block 200 when a datapacket is transmitted over the network 14 from the second roam socket module 34b to the first roam socket module 34a using the second and first active sockets 32b, 32a, respectively. At block 202, the first roam socket module 34a responds to the data packet with an association request message transmitted to the second roam socket module 34b. Upon receiving the association request message, the second roam socket module 34b may determine if association is desirable at block 204. If not, an association acknowledgement request message rejecting the request is transmitted to the first roam socket module 34a at block 206. At block 208, the association operation ends.

If the association is desirable, the second roam socket module 34b may transmit an acknowledgement request message to the first roam socket module 34a accepting the request at block 210. At block 212, the first roam socket module 34a determines if additional data packets from the second roam socket module 34b are received instead of the acknowledgement request message. If yes, the operation returns to block 202 and transmits another association request message. If the acknowledgement request message is received instead of additional data packets, the first and second roam modules 34a, 34b exchange messages containing identifying information to set up the association link at block 214.

Referring once again to FIG. 5, when an application 22 is migrated, the roam socket module 34 and the association table 40 operating with the application 22 may also be migrated. As known in the art, UDP does not guarantee reliability. As such, data packets may be lost during a UDP socket migration. The roam socket modules 34 also may not implement transmission reliability. In addition, freezing and flushing of the active sockets 32 as in the previously discussed embodiments utilizing the TCP communication protocol is unnecessary.

In embodiments using the UDP communication protocol, during a migration event, the running state of a roam socket module 34 may be encoded and migrate with along with the application 22 operating in conjunction therewith. In addition, the association table 40 operating in conjunction with the roam socket module 34 may also be encoded and migrated. In one embodiment, encoding involves serialization that may be performed with a java.io.serializable interface. In other embodiments, other forms of encoding may be utilized.

Following migration, the migrated roam socket module 34 may create an active socket 32 for communication over the network 14. In addition, the migrated roam socket module 34 may reestablish communication with previously associated peer roam socket modules 34 as a function of the identifying information in the migrated association table 40. The migrated roam socket module 34 may send a re-association message and a corresponding re-association acknowledgement message may be sent in reply. The re-association message may include identifying information such as, for example, a host address and a port address for the host device on which the roam socket module 34 is currently operating. As a function of the re-association and re-association acknowledgement messages, the association link may be updated to reflect the migration event.

In addition to updating the association tables 40, an address translation table 42 operating in conjunction with each of the peer roam socket modules 34 may also be updated. The address translation table 42 provides a table for translating between identifying information associated with the application 22 prior to the migration event and identifying information associated with the application 22 following the migration event. In one embodiment, the address translation table 42 provides a cross-reference of the host address and port address of migrated roam socket modules 34. As such, any data packet sent to the prior host device may be translated as a function of the address translation table 42 and transmitted to the correct host device in the network 14.

Through the use of the association table 40 and the address translation table 42, reestablishment of communications is almost transparent to the migrated application 22. In addition, application developers designing migrateable applications may implement the socket migration architecture 10 for UDP communications to avoid the significant coding that would otherwise be required in both the migrated application 22 as well as the applications 22 communicating with the migrated application 22 prior to the migration event. Further, the address translation table 42 shields the applications 22 from tracking the migration events. As such, design by application developers, as well as operation of the applications 22 may be simplified.

As in the previously described association operation, the re-association message and/or the re-association acknowledgement message may be dropped by the UDP communication protocol. In one embodiment, the use of a timeout mechanisms is similarly avoided by monitoring to confirm that the re-association acknowledgement message is received prior to any other data packets. Where data packets are received prior to the re-association acknowledgement message, the migrated roam socket module 34 may retransmit the re-association message. In other embodiments, other forms of transmission confirmation may be utilized. The association tables 40 also provide the ability to form association links between any number of applications 22 to re-establish peer-to-peer communication following a migration event.

Figure 7:
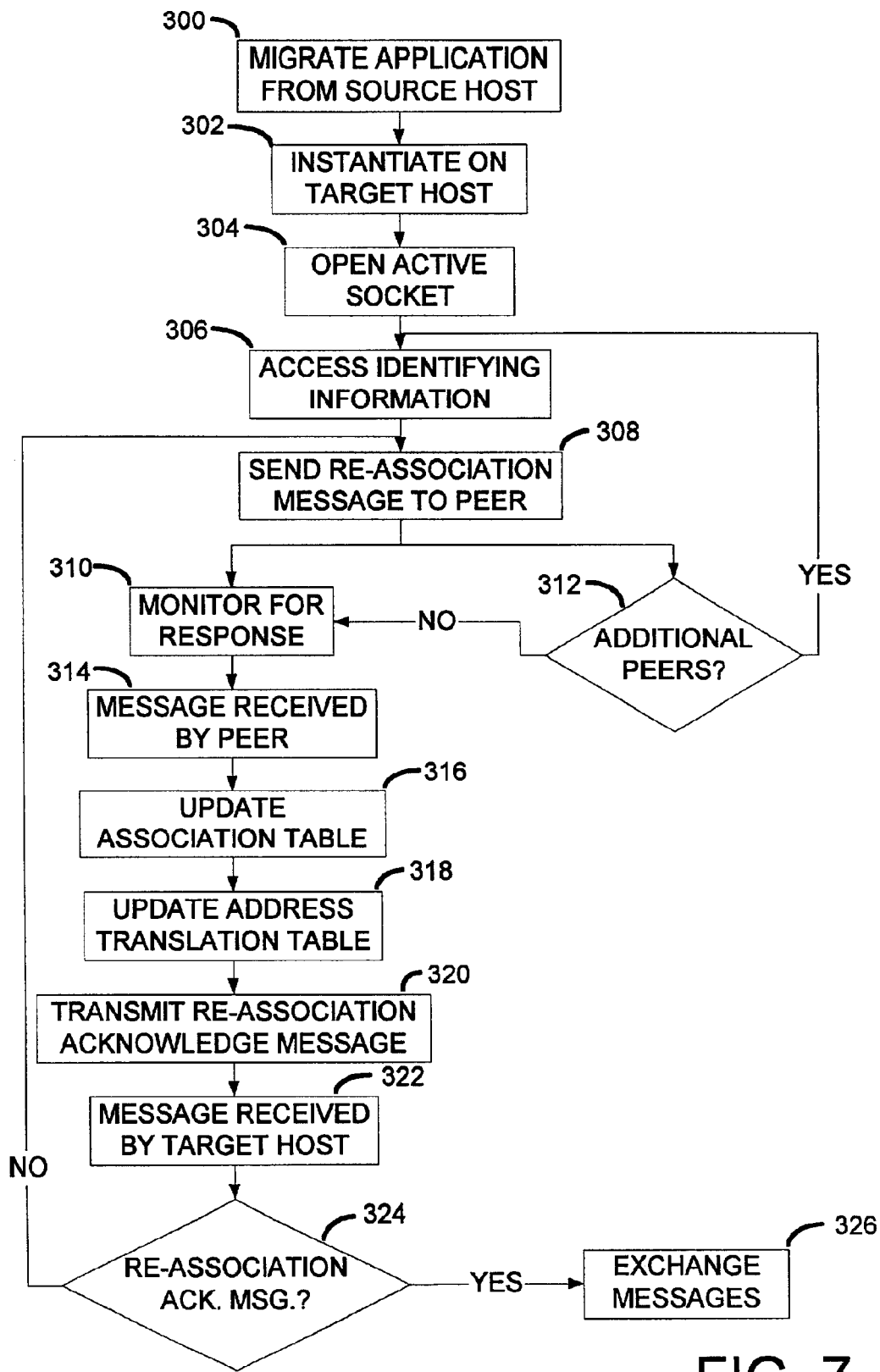
FIG. 7 is a flow diagram illustrating migration with the socket migration architecture within the communication system depicted in FIG. 5.

FIG. 7 is a block diagram illustrating operation of the socket migration architecture 10 during migration of an application 22 and re-establishment of peer-to-peer communication within the communication system 12 illustrated in FIG. 5. In this exemplary operation, the peer-to-peer communication and association link of the first application 22a and the second application 22b has already been completed as previously described with reference to FIG. 6. In addition, the first application 22a operating on the source host 16 has been directed to migrate to the target host 20. In other exemplary operations, peer-to-peer communications and association links may be established between any number of applications 22 operating on different host devices.

Referring to FIGS. 5 and 7, the operation begins at block 300 when the first application 22a along with the first roam socket module 34a and the first association table 40a are encoded and migrated from the source host 16 to the target host 20 as illustrated by arrow 46 in FIG. 5. At block 302, the first application 22a, the first roam socket module 34a and the first association table 40a are decoded and instantiated on the target host 20. The first roam socket module 34a opens an active socket 32 (third active socket 32e in FIG. 5) at a system allocated port at block 304. At block 306, the first roam socket module 34a accesses the first association table 40a. The first association table 40a is accessed to obtain identifying information for peer roam socket modules 34 (second roam socket module 34b) previously associated with the first roam socket module 34a.

The first roam socket module 34a sends a re-association message to one of the peer roam socket modules 34 (second roam socket module 34b) identified in the first association table 40a at block 308. At block 310, the first roam socket module 34a monitors the third active socket 32e for communication over the network 14. In addition, at block 312, the first association table 40a is checked to determine if additional peer roam socket modules 34 exist that have not yet been sent a re-association message. If yes, the operation returns to block 306. If no, monitoring continues at block 310

At block 314 a re-association message is received by one of the peer roam socket modules 34 (second roam socket module 34b). The association table 40 (second association table 40b) operating in conjunction with the second roam socket module 34b is updated based on the re-association message at block 316. The association table 40 is updated with identifying information (such as a host address and port address) to reflect that the first roam socket module 34a is now operating on the target host 20. At block 318 the address translation table 42 is updated. The address translation table 42 is updated to provide mapping indicating the first roam socket module 34a has been migrated from the source host 16 to the target host 20. The second roam socket module 34b transmits a re-association acknowledgment message to the first roam socket module 34a at block 320.

At block 322, the re-association acknowledgement message from the second roam socket module 34b is received at the target host 20 by the first roam socket module 34a. At block 324, the first roam socket module 34a determines if the message is the re-association acknowledgment message from the second roam socket module 34b. If no, the operation returns to block 308 and transmits another re-association message. If it is determined that a re-association acknowledgement message is received, the first and second roam modules 34a, 34b exchange messages at block 326.

The previously discussed embodiments of the socket migration architecture 10 provide migration capability for communication sockets operating in conjunction with applications 22 capable of migration among heterogeneous host devices. The socket migration architecture 10 provides an abstract association link between applications 22 that allows the continuation of peer-to-peer communications established prior to a migration event. The temporary suspension of peer-to-peer communications during migration may be almost transparent to the applications 22 involved in the migration. As such, interruption in communication between the applications 22 is minimized and continuity in the coordinated operation of applications 22 engaged in peer-to-peer communications is maintained.

The socket migration architecture 10 utilizes existing communication protocols without modification to the protocols or the operating systems supporting the protocols. As such, the socket migration architecture 10 may be relatively easy to deploy. In addition, the socket migration architecture 10 includes features to maintain, and even enhance, the operational characteristics and features of the communication protocols. Accordingly, application developers may implement the socket migration architecture 10 to avoid significant coding that would otherwise be required within migrateable applications.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of migrating a communication socket of an application operating on a first host device, the communication socket forming one end of a connection between the first host device and a second host device, the method comprising:
   a) suspending the transfer of input/output data between an application and a migrateable socket operable with the application on the first host device;
   b) buffering an input datastream received by the migrateable socket over the connection;
   c) migrating the application, the buffered input datastream and the migrateable socket to a third host device;
   d) reestablishing the connection between the second host device and the third host device as a function of the migrateable socket; and
   e) providing the buffered input datastream to the application as a function of the migrateable socket.

2. The method of claim 1, wherein the connection comprises a transmission control protocol (TCP) connection.

3. The method of claim 1, comprising the initial act of associating the migrateable socket with another migrateable socket operable with another application on the second host device.

4. The method of claim 3, wherein associating the migrateable socket with another migrateable socket comprises exchanging an object reference of each of the migrateable sockets via the connection, the object reference of each of the migrateable sockets comprising identifying information of the respective first and second host devices.

5. The method of claim 1, wherein a) comprises transmitting a close message to a migrateable socket operating on the second host device.

6. The method of claim 5, wherein the migrateable socket of the second host device performs a) and b).

7. The method of claim 1, wherein the migrateable socket comprises a roam socket module and an active socket and c) comprises closing the active socket prior to migration.

8. The method of claim 1, wherein the migrateable socket comprises a roam socket module and an active socket and c) comprises:
   encoding the buffered input datastream and an execution state of the roam socket module; and
   transmitting the encoded buffered input datastream and the execution state to the third host device.

9. The method of claim 1, wherein d) comprises:
   opening a server socket on the third host device with the migrateable socket;
   initiating handshaking between the second host device and the third host device; and
   opening an active socket on the second host device and the third host device during handshaking.

10. A method of migrating a communication socket operating in conjunction with an application, the method comprising:
    a) communicating over a network with a communication protocol between a first active socket operating in a first layer of a first host device and a second active socket operating in the first layer of a second host device;
    b) associating a first roam socket module operating in a second layer of the first host device with a second roam socket module operating in the second layer of the second host device via communication over the network between the first active socket and the second active socket;
    c) migrating the first roam socket module to a third host device; and
    d) establishing communication between the third host device and the second host device with the first and second roam socket modules as a function of the association.

11. The method of claim 10, wherein the first layer is transportation layer and the second layer is one of a session layer, a presentation layer and an application layer.

12. The method of claim 10, wherein b) comprises exchanging a host address and a port address of the first host device and the second host device.

13. The method of claim 10, wherein d) comprises:
    opening a third active socket with the first roam socket module and a fourth active socket with the second roam socket module; and
    communicating over the network between the first and second roam socket modules with the third and fourth active sockets.

14. The method of claim 10, wherein the communication protocol comprises transport control protocol (TCP).

15. The method of claim 14, wherein c) comprises:
    reading data from the first and second active sockets;
    buffering data from the first active socket in a first synchronization buffer and data from the second active socket in a second synchronization buffer; and
    migrating the first synchronization buffer to the third host device.

16. The method of claim 15, further comprising e) reading the data from the first and second synchronization buffers before processing data from communication between the third host device and the second host device.

17. The method of claim 10, wherein the communication protocol comprises user datagram protocol (UDP).

18. The method of claim 17, wherein b) comprises creating an association table operable with the first roam socket module, the association table comprising a host address and a port address for the second host device.

19. The method of claim 18, wherein c) comprises migrating the association table to the third host device.

20. The method of claim 19, wherein d) comprises sending a re-association request message to the second host device as a function of the association table.

21. A method of migrating a communication socket of an application, the communication socket and application operable on a host device to communicate with other host devices over a network, the method comprising:
 a) communicating between a plurality of host devices with a communication protocol, each host device comprising an application, a migrateable socket and an association table;
 b) storing identifying information exchanged between the host devices in each respective association table to form an association link;
 c) migrating a first application, a first migrateable socket and a first association table from a first host device to a second host device;
 d) sending a re-association message from the second host device to a host device identified in the first association table as a function of the first migrateable socket; and
 e) receiving a re-association acknowledgment message from the identified host device with the first migrateable socket.

22. The method of claim 21, wherein the communication protocol comprises a user datagram protocol (UDP).

23. The method of claim 21, wherein the identifying information comprises a host address and a port address.

24. The method of claim 21, wherein d) comprises:
 opening an active socket with the first migrateable socket; and
 sending the re-association message via the active socket with the communication protocol.

25. The method of claim 21, wherein d) comprises including a host address and a port address for the second host device in the re-association message.

26. The method of claim 21, wherein d) comprises:
 receiving the re-association message with a migrateable socket operable in the identified host device;
 updating an association table in the identified host device as a function of the re-association message; and
 sending the re-association acknowledgement message with the migrateable socket in the identified host device.

27. The method of claim 26, further comprising updating an address translation table in the identified host device to reflect migration from the first host device to the second host device, wherein the address translation table redirects communication addressed to the first host device to the second host device.

28. The method of claim 21, wherein d) comprises resending the re-association message when data packets are received from the identified host device prior to the re-association acknowledgement message.

29. A socket migration architecture for migrating a communication socket of an application, the communication socket for communication between a first host device and a second host device over a network, the socket migration architecture comprising:
 a migrateable socket operable on the first host device, wherein the migrateable socket is operable to form one end of a connection between the first and second host devices; and
 a synchronization buffer operable with the migrateable socket on the first host device, the synchronization buffer operable to store an input datastream provided by the second host device during a migration event,
 the synchronization buffer and the migrateable socket operable to migrate from the first host device to a third host device,
 the migrateable socket operable on the third host device to reestablish the connection between the second and third host devices,
 the migrateable socket operable to extract the stored input datastream from the synchronization buffer once the connection is reestablished.

30. The socket migration architecture of claim 29, wherein the connection is a transfer control protocol (TCP) connection.

31. The socket migration architecture of claim 29, wherein the migrateable socket comprises a roam socket module and an active socket.

32. The socket migration architecture of claim 31, wherein the migrateable socket is operable to close the active socket prior to migration.

33. The socket migration architecture of claim 32, wherein the migrateable socket is operable to open an active socket to reestablish the connection.

34. The socket migration architecture of claim 29, wherein the input datastream comprises data flushed from the second host device.

35. The socket migration architecture of claim 29, further comprising a migrateable socket and a synchronization buffer operable on the second host device, the migrateable socket operable on the second host device to form a second end of the connection, the synchronization buffer operable on the second host device to store an input datastream provided from the first host device during a migration event.

36. The socket migration architecture of claim 29, wherein the synchronization buffer is operable to store the input datastream when input/output data of the application operable with the migrateable socket on the first host device is frozen in preparation for migration.

37. The socket migration architecture of claim 29, wherein the migrateable socket is operable to form an association link with the second host device.

38. A socket migration architecture for migrating a communication socket of an application, the communication socket and application operable on a host device to communicate with other host devices over a network, the socket migration architecture comprising:
 a migrateable socket operable in a first host device to communicate with at least one other host device with a communication protocol; and
 an association table operable in the first host device to store identifying information provided with the communication protocol from the at least one other host device,
 the migrateable socket and the association table migrateable from the first host device to a second host device, the migrateable socket operable in the second host device to send a re-association message with the communication protocol to the at least one other host device as a function of the identifying information, the migrateable socket operable to receive a re-association acknowledgement message with the communication protocol from the at least one other host device.

39. The socket migration architecture of claim 38, wherein the communication protocol comprises a user datagram protocol (UDP).

40. The socket migration architecture of claim 38, wherein the migrateable socket comprises a roam socket module and an active socket.

41. The socket migration architecture of claim 38, wherein the re-association message comprises a host address and a port address of the second host device.

42. The socket migration architecture of claim 38, wherein the at least one other host device comprises a migrateable socket, an association table and an address translation table.

43. The socket migration architecture of claim 42, wherein the address translation table is operable to store a cross-reference between identifying information of the first host device and the second host device when the re-association message is received.

* * * * *